United States Patent [19]

Nagy

[11] 4,353,702
[45] Oct. 12, 1982

[54] SAILING CRAFT MAINSAIL AND AUXILIARY PROPULSION MEANS THEREFOR

[75] Inventor: Laszlo Nagy, Barberton, Ohio
[73] Assignee: F M Machine Company, Akron, Ohio
[21] Appl. No.: 170,921
[22] Filed: Jul. 21, 1980
[51] Int. Cl.³ .......................................... B63H 13/00
[52] U.S. Cl. .................................. 440/8; 416/132 B; 114/89; 114/102
[58] Field of Search .................... 416/132 B; 417/334; 290/55; 74/381; 440/8, 83; 114/39, 89, 90, 97, 102, 103, 111

[56] References Cited

U.S. PATENT DOCUMENTS 1,417,000  5/1922  Vogt ............................ 416/132 B
1,471,870  10/1923  Tust ................................. 440/8
4,276,033  6/1981  Krovina ............................ 440/8

FOREIGN PATENT DOCUMENTS 604956  7/1948  United Kingdom ................ 440/8

Primary Examiner—Trygve M. Blix
Assistant Examiner—D. W. Keen
Attorney, Agent, or Firm—L. A. Germain

[57] ABSTRACT

A configuration for a sailboat mainsail comprises a rotating wind-mill like sail structure mounted on a rotating pedestal base. The wind driven rotating sail delivers power to the sailboat propeller through a flexible driveshaft and transmission and thus provides an ability to sail a particular desired course direction irrespective of the direction from which the wind is blowing.

20 Claims, 9 Drawing Figures

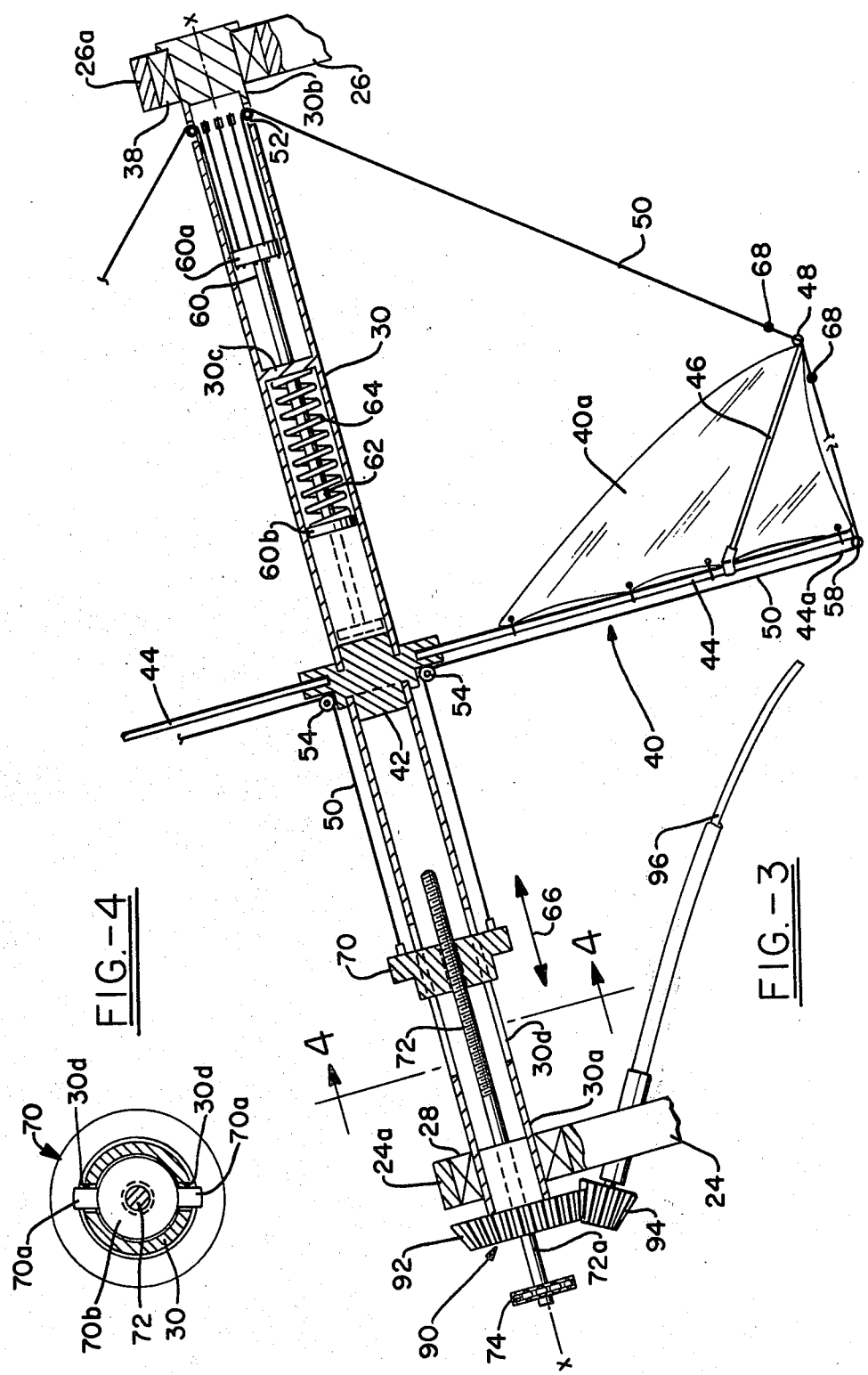

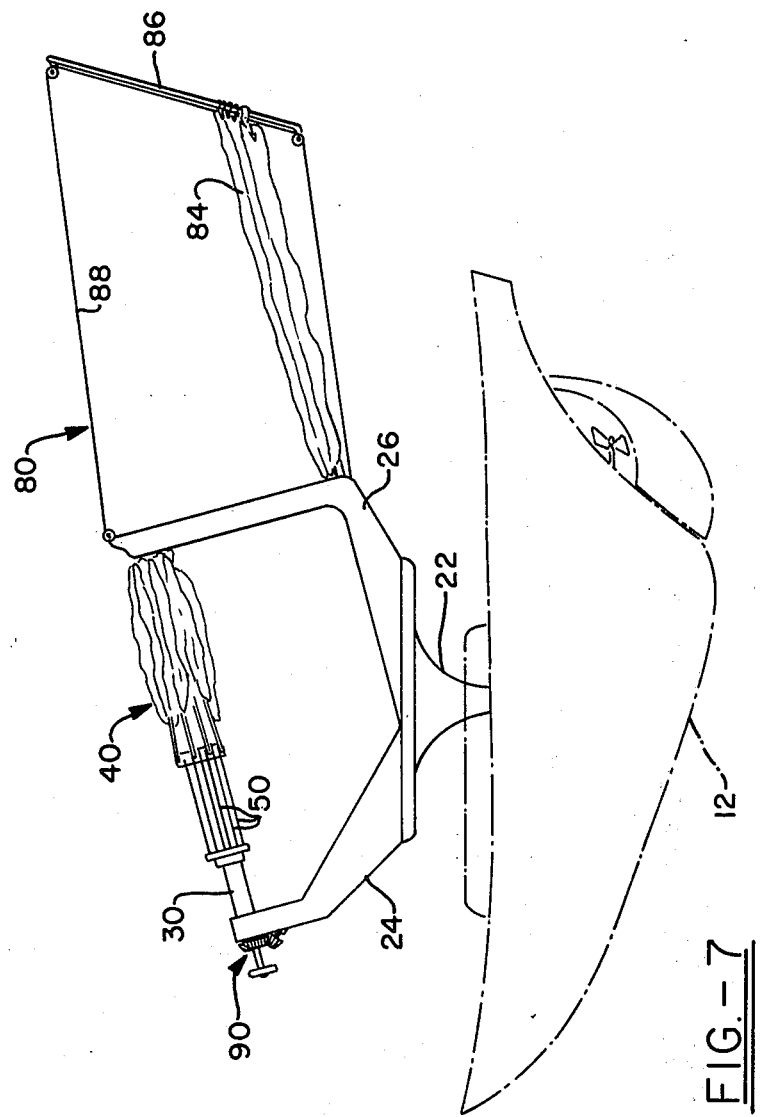

SAILING CRAFT MAINSAIL AND AUXILIARY PROPULSION MEANS THEREFOR

BACKGROUND OF THE INVENTION

This invention generally pertains to sailing craft and more particularly to a novel rotating configuration for a sailboat mainsail and to propulsion means working in conjunction therewith for auxiliary power to move the boat in a particular desired direction irrespective of the direction from which the wind is blowing.

Configurations for sailing craft have not changed much as pertaining to masted sailing configurations, there being numerous and various types of single and multiple masted craft depending upon the size and type of hull structure. Typically, sailing craft have carried fabric sails on vertical masts, which sails are of a substantially triangular shape with the vertex of the triangle being carried aloft and positioned at the top of the mast. A horizontal boom, mounted for rotation about the vertical mast, extends the sail outwardly from the mast so as to present the most effective sail configuration to the wind and thus drive the boat before the wind at its most efficient form for a particular wind velocity and direction. All such type sailing craft, because of the mast/sail configuration and vagaries of the wind, must therefor strike a zig-zag course to reach a particular destination. "Tacking" is the well known and understood zig-zag sailing technique practiced by sailors since time immemorial inasmuch as such craft cannot sail a straight line course between two fixed points. As a matter of fact it is well known that sailing craft cannot sail to within 45 degrees, more or less, of the direction from which true wind is blowing. Except then, for the 45 degrees on either side of what is termed "the eye of the wind" a well-designed and modern sailing sloop can sail in any direction.

It is therefor one aspect of the present invention to provide a sailboat mainsail configuration that obviates the requirement to "tack" when wind conditions are unfavorable.

It is a further aspect of the invention to provide a propulsion means for sailboats that works in conjunction with a wind driven mainsail such that any type sailing craft may be driven further into the wind than has herebefore been possible.

SUMMARY OF THE INVENTION

Various aspects and advantages of the invention which will become apparent as the description proceeds are provided in a sailing craft mainsail configuration comprising a plurality of sailblades mounted on a shaft that rotates in response to wind, the mainsail configuration including a pedestal base that carries the rotating sailblades topside of the craft while being anchored for rotation within the hull of craft to maintain the rotating sailblades directed into the wind. The rotating shaft is adapted to drive the sailing craft propeller via a flexible drive shaft coupled into a transmission to thus effect motion of the craft in any desired course direction irrespective of the direction from which the wind is blowing.

BRIEF DESCRIPTION OF THE DRAWINGS

FIG. 3 is a side elevational view showing the mainsail hub rotating shaft configuration and one embodiment of means for controlling the amount of sail presented to the wind;

FIG. 4 is an enlarged, sectional, elevational view of the shaft as taken on line 4—4 of FIG. 3;

FIG. 7 diagramatically illustrates a leeward folding of the mainsail sailblades in the event of a dangerous and high wind condition;

DETAILED DESCRIPTION OF THE INVENTION

Figure 1:
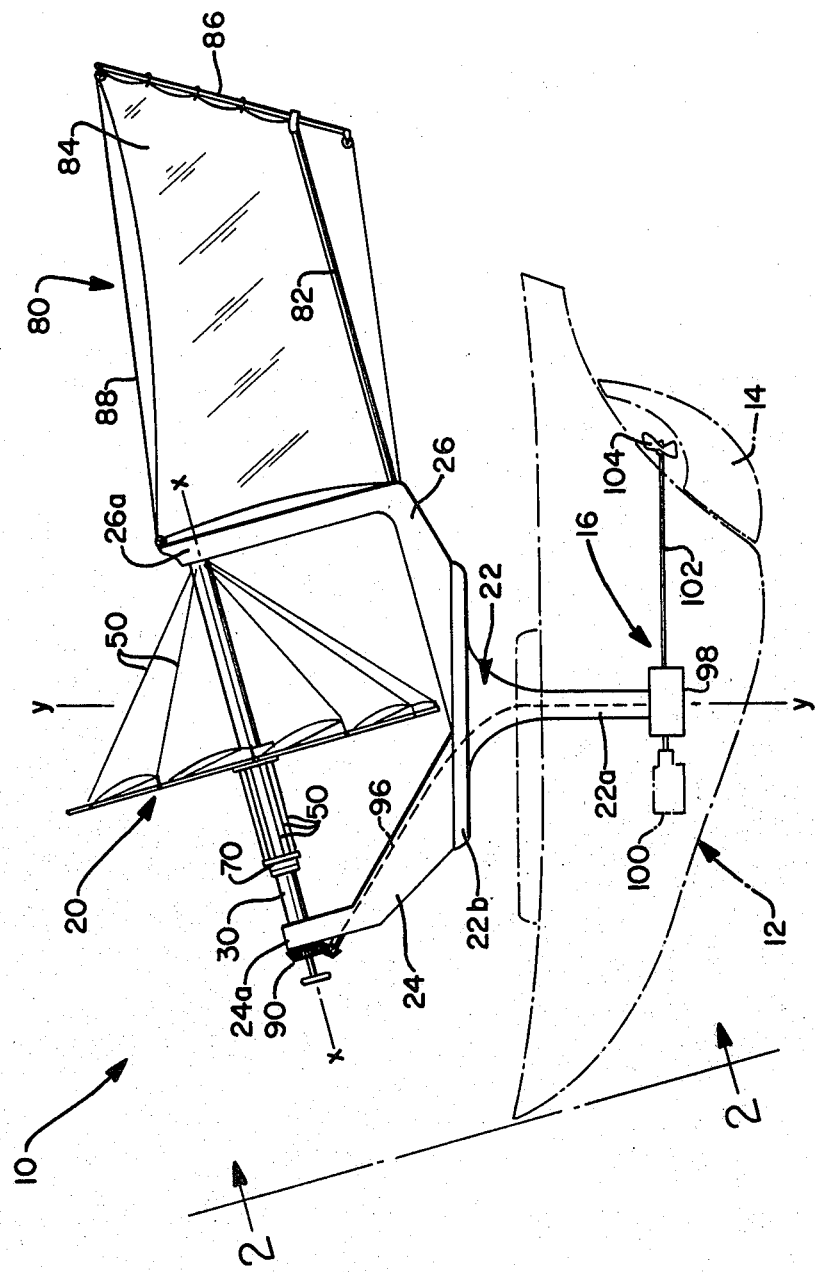
FIG. 1 is a side elevational view of a sailboat carrying the mainsail configuration comprising the instant invention with the boat hull being shown in ghost lines for ease of illustration.
Figure 2:
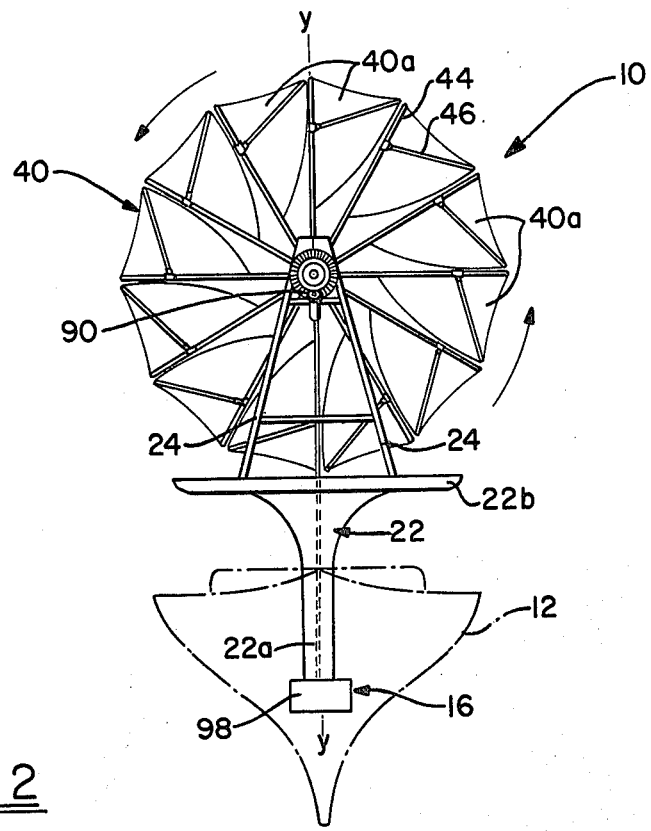
FIG. 2 is a frontal elevational view of the mainsail configuration shown in FIG. 1 as may be taken from a vantage on line 2—2 thereof.

Referring to FIGS. 1 and 2, a sailboat in accordance with this invention is generally indicated by reference numeral 10, which boat 10 generally comprises a hull 12 (shown in ghost lines) steering means 14, auxiliary propulsion means 16, and a sail configuration 20 mounted topside of the hull 12 to provide wind propulsion of the boat. In contrast to typical sailing craft of the prior art that have stationary vertical masts, this invention provides a sail configuration that rotates about an x—x axis and which is in turn mounted on a mast 22 that further rotates about a y—y axis. The mast 22 is a pedestal configuration having a base portion 22a anchored for rotational motion within the boat hull 12. Various means and methods of such mounting are considered within the abilities of a skilled mechanic and therefor a specific mounting structure is not shown, suffice to say that the type of mounting will depend upon the particular size of boat, it's hull structure and/or configuration, and upon the relative size sail configuration 20 required for a particular craft. Further in this respect, it should be understood that the drawings are for illustrative purposes only, the relative size and position of the elements being dependent upon the particular boat design for which it is intended.

Exteriorly of the hull 12 the pedestal mast 22 is characterized by a platform 22b that carries the sail configuration. Mounted in a windward position on the pedestal platform 22b are windward bracing members 24 and mounted in a leeward position on the platform 22b are leeward bracing members 26. The bracing members 24,26 are A-frame type braces that carry a tubular shaft 30 at their upper ends 24a,26a, which shaft 30 is coaxial and rotatable about the x—x axis. Rotation of the shaft 30, as indicated in FIG. 3, is enhanced by bearings 28 carried at the windward end 30a in co-operation with the windward braces 24 and by bearings 38 carried at the leeward end 30b in co-operation with the leeward braces 26. The mast 22 comprising the base 22a, platform 22b, bracing members 24 and 26, and the tubular shaft 30 may be made of any high strength, lightweight metal or synthetic material known and used by those artisans knowledgeable in the manufacture of sailing craft. Such materials of course will be capable of carrying the load requirements imposed by the mainsail configuration mounted thereon and to be described in detail hereinafter.

Figure 5:
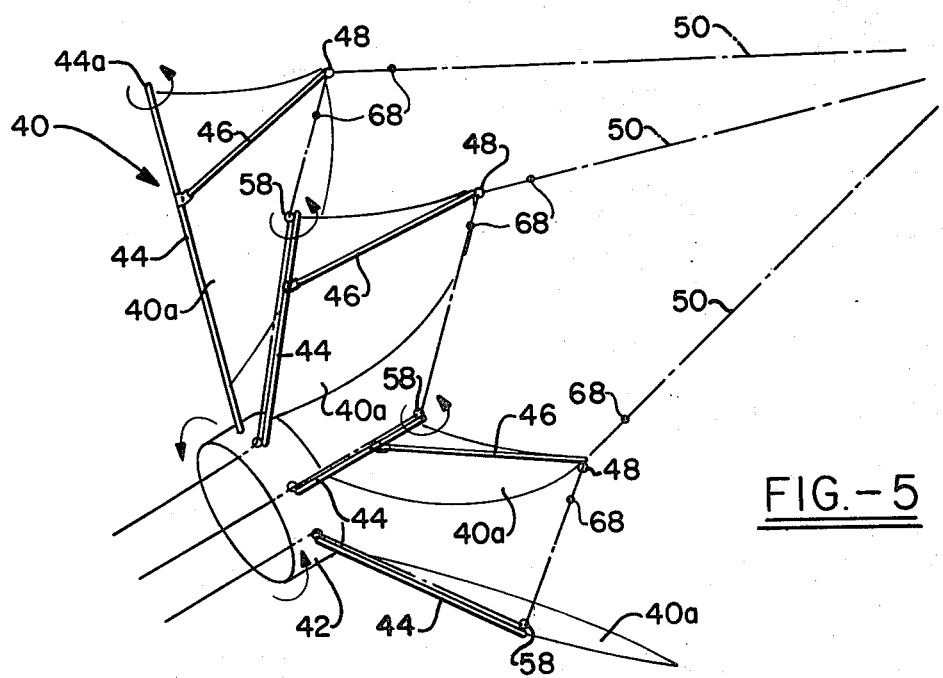
FIG. 5 diagramatically illustrates a line arrangement forming one embodiment for changing the orientation of the mainsail sailblades.

Referring now also to FIGS. 3, 4, and 5, there is mounted on the shaft 30 and approximately midway between the braces 24,26 a windmill-like sail configuration generally indicated via reference numeral 40. The windmill-like mainsail 40 is mounted on a hub 42 which may be made to interconnect a windward shaft element 30a to a leeward shaft element 30b as shown in FIG. 3. Alternatively, the hub 42 may be mounted on a continuous shaft 30 in any conventional manner and this is considered within the skill of a mechanic. The hub 42 has a plurality of evenly spaced radially extending spokes or spars 44 mounted about its periphery which carry a like number of fabric sails or sailblades 40a. The sailblades 40a may be made of any common sail materials, fabric or the like and fastened in the well known manner to a boom 46 that extends the sails outwardly from the spars 44. It will be immediately apparent that the substantially triangular shaped sailblades 40a are mounted in an inverted position with the vertex of the triangle being located toward the mainsail hub 42 rather than at the outer extent of the spar 44. Thus, and because of the circular configuration of the mainsail 40, the booms 46 are positioned outwardly toward the free end 44a of the spar 44. Further, and as clearly illustrated in FIG. 2 of the drawings, the sail material 40a need not completely fill the space between the spars 44 especially in the area of the hub 42 inasmuch as the most effective sail area presented to the wind is toward the outer extent of the spar 44. It will be appreciated by those persons knowledgeable in the sailing technique that elimination of the sail blade material in the close area of the hub 42 will provide for more accurate trimming of the sails and control of the rotational speed of the mainsail 40. While not specifically shown in the drawings, it is anticipated that the mainsail rotation may also be controlled by a braking mechanism mounted at either end of the shaft 30 and the pedestal 22 may also have its rotation controlled by a braking mechanism mounted at the base portion 22a. Further with respect to controlling of the sailblade area that is presented to the wind, each boom 46 may have an eye fastener 48 or the like at its outward end through which a line or cable 50 passes in the leeward direction to a point on the tubular shaft 30 where it enters the bore of the shaft via an access opening 52. The line 50 is then terminated and connected to a movable piston 60 mounted in the shaft bore. The line 50 is also passed in the windward direction to an eye fastener 58 mounted on an adjacent spar 44 and passed down the spar to a roller or pulley 54 at the base of the spar and thereafter terminated and connected to a movable collar 70 mounted on the shaft 30. While the showing in FIG. 3 appears to depict the line 50 as being strung from a boom ring 48 to an attached spar ring 58, it will in actual practice be strung from a boom ring 48 to a spar ring 58 on an adjacent spar. This of course accomodates movement of the boom 46 in an approximate arc of 90 degrees about its spar 44 to change the sail configuration presented to the wind as will be more fully described hereinafter.

To continue, the piston 60 has an end member 60a that terminates the ends of all lines 50 within the tubular shaft 30 and has a spaced apart second end member 60b interconnected to end 60a via a rod 62. Carried between the piston ends 60a, 60b is a spring 64 that effects maintenance of tension on the lines 50 when the collar 70 is moved on the shaft 30 in the direction of arrow 66. The amount of sail 40a presented to the wind is changed by a pair of stops 68 fastened to the line 50 on either side of the boom ring 48 and by movement of the line in either the windward or leeward directions. For example, movement of the collar 70 toward the hub 42 allows expansion of the spring 62 and movement of the line 50 through eye 48 in the leeward direction. This movement forces a stop 68 on the windward side against the ring 48 and thus moves the sail blade 40a in the leeward direction thus exposing less sail surface area to the wind. In the same manner, movement of the collar 70 away from the hub 42 effects compression of the spring 64 between piston end 60b and a stop 30c within the tube 30 and a leeward line stop 68 moves the sail blade 40a in the windward direction or to a more closed position and thus presents more sail surface area to the wind. Because of the orientation of the boom rings 48, the line 50 is passed through a ring 48 on a boom 46 and to a spar ring 58 on an adjacent spar 44 as illustrated in the diagramatic view of FIG. 5.

Referring further to FIGS. 3 and 4, the collar 70 is maintained in a specific orientation on the shaft 30 by a pair of guides 70a that move in slots 30d provided in the shaft. The collar 70 is moved by a screw 72 that is mounted through the end of the shaft 30 and threaded through the central portion of the collar at 70b. As readily apparent from the drawings, clockwise rotation of the screw 72 draws the collar 70 away from the mainsail hub 42 and thus draws the line 50 in the windward direction and more sail surface is presented to the wind. In the same manner, turning of the screw in the counterclockwise direction moves the collar 70 toward the hub 42 and the sail blades 40a are turned in the leeward direction and less sail surface is presented to the wind. The screw 72 may have means 74, such as a hand wheel, pulley, or the like mounted at the end 72a to effect adjustment of the sail blades in the desired orientation by personnel on the boat.

It will be apparent to those skilled in the art that the line tensioning means comprised of a piston 60 and spring 64 may be replaced by other configurations. For example, while the spring 64 is in compression when the sail blades 40a are in their closed position, an alternative would have the spring connected to the hub 42 and to the lines 50 entering the tubular shaft 30 such that the spring is in tension when the sail blades 40a are in the closed position. The invention therefore anticipates that other configurations and mechanical means may be applied to tension the lines 50 and the invention is not considered limited by the apparatus shown and described.

Figure 6:
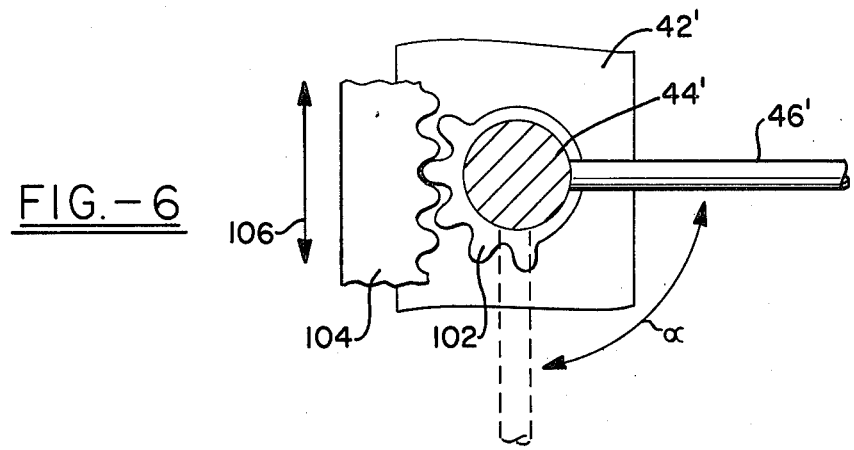
FIG. 6 illustrates a second embodiment for changing the sailblade orientation with but one sail spar being shown for ease of illustration.

While the sailblade 30a orientation may be varied by way of a line handling technique as herebefore described, an alternative mechanical arrangement is illustrated in the drawing of FIG. 6. In this embodiment, the sail booms 46' are affixed rigidly to spars 44' and the spars are mounted for rotation within a hub 42'. Each spar will carry a toothed gear 102 that intermeshes with a circular gear 104 mounted on the shaft 30 and being capable of rotating independently of the shaft rotation. In this embodiment, movement of the circular gear in the direction of arrow 106 rotates the plurality individual spars simultaneously within a 90 degree arc $\theta$ to the leeward direction and thus changes the amount of sail presented to the wind. Rotation of the circular gear may be a manual operation or it may be accomplished automatically using a small gear motor mounted and controlled in any conventional manner on the shaft 30.

Continuing with reference to FIG. 1, the mainsail configuration 20 also includes a relatively stationary sail 80 mounted leewardly of the rotating sail configuration 40. The stationary sail 80 comprises a boom 82 that extends a fabric sail 84 leewardly and a spar 86 that effects vertical extension of the sail 84 to a full sail mode via cables or lines 88 in the well known and understood manner. The boom 82 is mounted on the platform 22b between the leeward braces 26 and is attached in a stationary manner to the platform 22b and/or braces 26. In this circumstance the wind passing through or around the rotating sailblades 40a also affects the vertical sail surfaces of the sail 80 and while this sail provides a means for automatically keeping the rotating sailblades directed into the wind by reason of the rotating pedestal mast, it also provides a conventional sail for the boat.

Because the mainsail configuration 40 is rotating, it provides a unique power source that may be coupled into the auxiliary propeller drive 16 of the boat. This may be accomplished, for example, by a bevel gear set generally indicated by reference numeral 90 in FIGS. 1 and 3. The gear set 90 comprises a first gear 92 mounted at the end of the shaft 30 in a conventional manner, which gear drives a second meshing gear 94 mounted at the upper end 24a of the brace 24. The gear 94 is coupled to a flexible drive shaft 96 that is connected into a transmission 98. The output of the transmission 98 of course delivers power to a boat propeller 104 via a drive shaft 102. Thus, it may be appreciated that the invention provides a wind driven power source for the boat propeller in addition to any other power sources the sailing craft may have on board. For example, larger sailing craft usually carry an auxiliary engine indicated by reference numeral 100, which engine is standard equipment for propelling the craft through harbors etc. and in this circumstance a transmission 98 may be adapted to provide a shift from the standard engine drive of the propeller to the wind driven drive provided by this invention. Such type transmissions are considered within the knowledge and skill of a mechanic and therefor are outside the scope of this invention. In any case, a suitable transmission of the type alluded to may be provided or else a simpler type adapted solely for interconnection of the flexible drive shaft 96 to the output propeller drive 102 may be used. Of course it is anticipated that either type transmission will also provide for a reverse rotation of the output propeller drive shaft 102 for no change in the rotation of the input shaft 96. Thus, both forward and reverse drive are within the capabilities of this invention.

Figure 8:
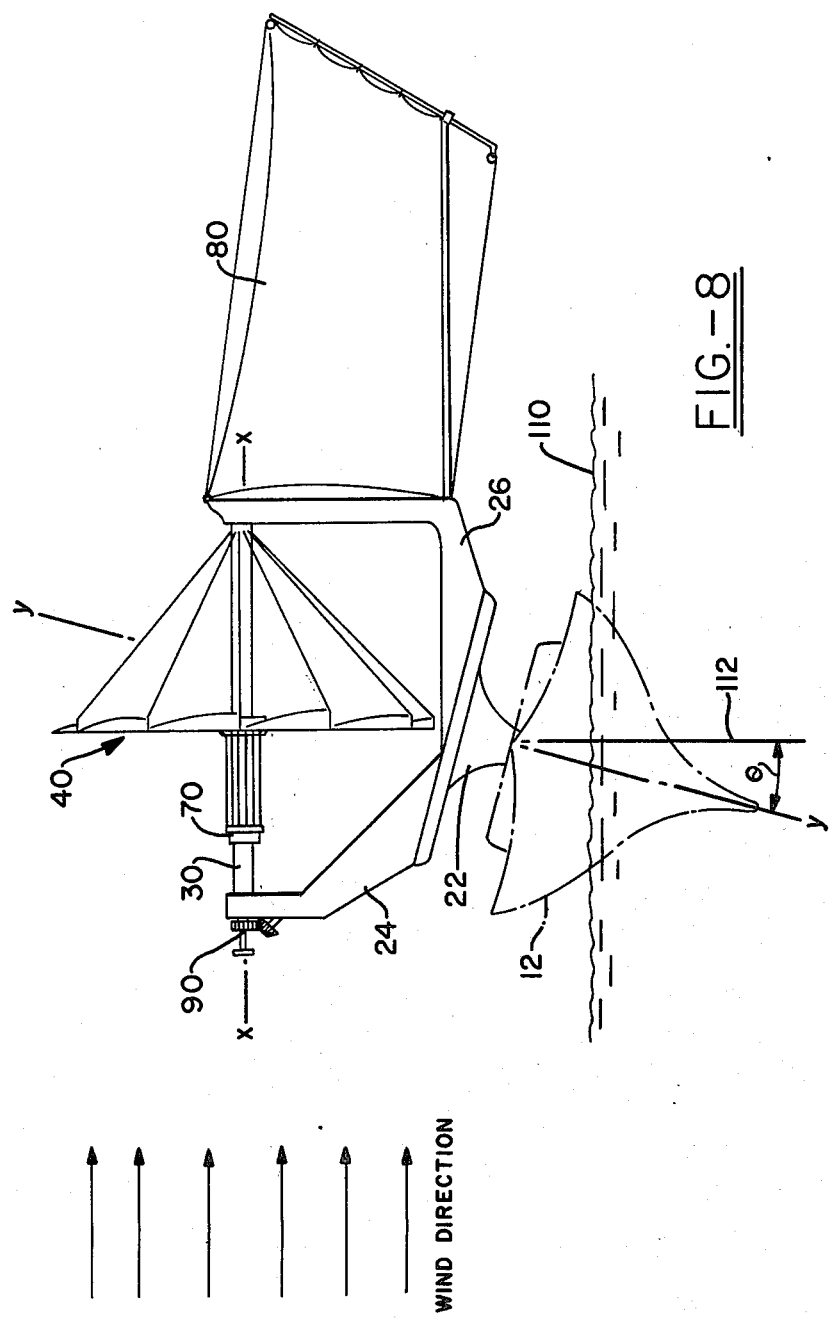
FIG. 8 diagramatically illustrates the effects of a wind "off the beam" on a sailboat carrying the mainsail comprising this invention.

Referring again to FIG. 1, it should be noted that the shaft 30 is not mounted horizontally with respect to the pedestal platform 22b and therefor it is not parallel to the topside of the boat hull 12. The reason for this is clearly shown diagramatically in FIG. 8 wherein the affect of a wind "off the beam" of the boat is illustrated. In this wind condition, and for that matter in most wind conditions, it is recognized that the most efficient form for a sailing hull structure is accomplished when the hull 12 is tilted or rolled at an angle $\alpha$ with respect to its normal or vertical position as indicated by reference numeral 112. To accomodate for hull roll therefor, the shaft 30 is established at a pre-selected maximum angle $\alpha$ between 10 degrees and 40 degrees with respect to horizontal or to the pedestal platform 22b. As clearly evident in FIG. 8, when the hull 12 rolls toward a maximum $\alpha$ shaft 30 tends toward a horizontal position with respect to the sea surface 110 and therefore the mainsail 40 is positioned to present it's most effective orientation with respect to the wind. Of course it is understood that all such sailing craft have a roll angle $\alpha$ past which there is no return and the boat will capsize. The mainsail of this invention therefore will be of such a size and balance for a particular hull structure that the same precautions that are required in sailing present state of the art craft will be required in sailing a craft having the mainsail of this invention mounted thereon. Of course the showing in FIG. 8 is more illustrative than will be the actual case inasmuch as any waterborne craft experiences pitch, roll, and yaw or simultaneous combinations thereof at any instant of time and therefor the orientation of the mainsail 40 with reference to the wind will continually change.

Figure 9:
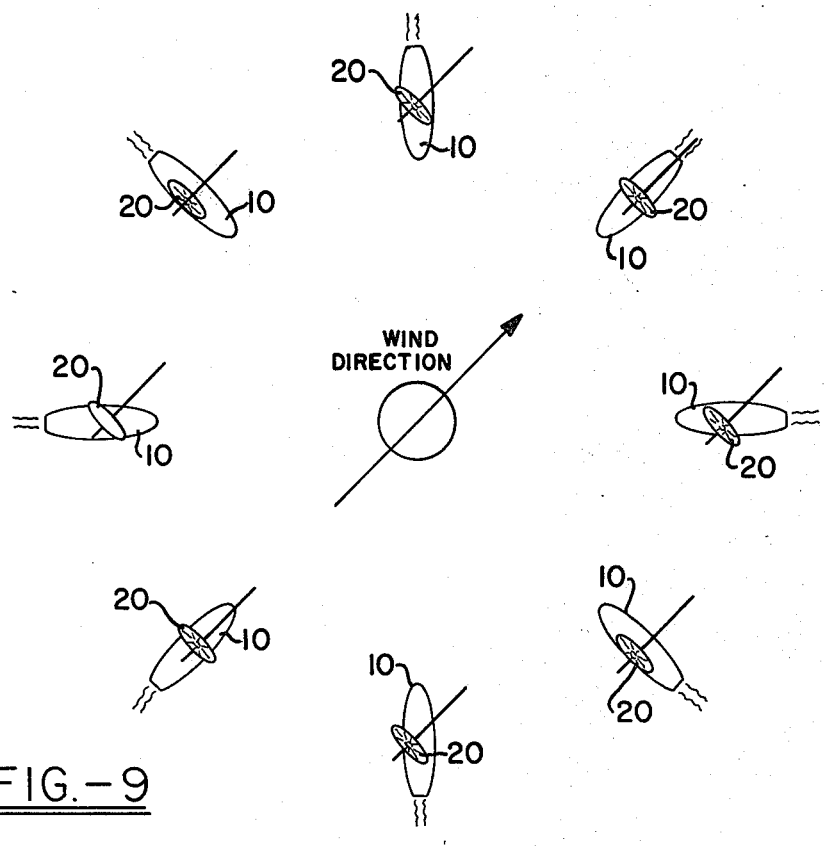
FIG. 9 diagramatically illustrates the capabilities of a sailing craft carrying the mainsail and propulsion means of this invention at various compass headings when the wind is blowing out of the Southwest.

FIG. 9 diagramatically illustrates by way of example the benefits obtained by the instant invention when the wind direction is out of the Southwest. As shown in the drawing, a sailing craft 10 outfitted with a mainsail 20 in accordance with this invention may sail any direction irrespective of the wind direction. How far into the "eye of the wind" the boat may be capable of sailing will of course depend upon various factors such as for example the drag on the boat and mainsail structure, the type propellers, the losses through the mechanical drive system, and the velocity of the wind. As herebefore mentioned, the actual mainsail size and configuration will vary from one type sailing craft to another and it is recognized that variations will exist to accomodate different type boat structures. Further, it is anticipated that the invention may be applied to as small a boat as exists in the marketplace. For example, it would not be out of the question to scale the rotating mainsail of this invention down for use on "day sailors" in the under ten foot length class. In this configuration the flexible drive shaft will be connected directly to a small propeller that may be temporarily mounted on the boat transom. Alternatively the invention may be scaled up for use on the most modern ocean-going sailing sloop and is therefor not considered limited to any specific size or configuration of sailing hull.

When wind conditions are most unfavorable for any type of sailing craft it will be necessary to stow the sails or risk being capsized. The rotating mainsail 40 therefore may be collapsed and/or folded in a manner to obviate this hazard. FIG. 7 illustrates a method to accomplish stowing of the mainsail wherein the spar members 44 are mounted on the hub 42 in such a manner that they may be collapsed onto the shaft 30 in the leeward direction. Various line or cable arrangements may be employed to accomplish raising or lowering of the spars 44 and such technique is considered within the knowledge of those skilled in the sailing art. Of course the sail member 80 may be collapsed and stowed on its boom 82 in the conventional manner.

From the foregoing description it will be appreciated that the invention provides a unique alternative to conventional sailing craft and while certain representative embodiments and details have been shown for the purpose of illustrating the invention, it will be apparent to those skilled in the art that various changes and modifications may be made therein without departing from the spirit or scope of the invention.

What is claimed is:

1. A wind-driven, water borne sailing craft comprising in combination:
    a flotation hull;
    a propeller mounted to move said hull through the water upon being rotated;
    means to steer said hull;
    a pedestal configured mast vertically mounted on said hull and having a substantially horizontal platform and capable of rotating about a substantially vertical axis;
    windward and leeward bracing members mounted in spaced-apart relationship on said platform;
    a tubular shaft mounted for axial rotation and carried between said windward and leeward bracing members, said shaft oriented at a windward-to-leeward angle with respect to the pedestal platform, said angle determined by the maximum roll that may be experienced by the hull without capsizing;
    a hub member mounted on said shaft between the bracing members to rotate with said shaft, said hub having a plurality of flexible fabric sailblades mounted about its periphery on spars connected into the hub, each of said sailblades extending outwardly from its respective spar by a boom affixed to the spar toward its outer extent;
    means associated with said sailblades for changing the orientation of said sailblades about their respective spar in the leewardly direction;
    a vertical sail mounted to the pedestal mast and positioned leewardly of the hub member to effect rotation of the mast in response to the direction of the wind so as to automatically maintain the sailblades directed into the wind; and
    means intercoupling the tubular shaft at one of its ends to the propeller to drive said propeller into rotation according to the rotational motion of the tubular shaft which in turn is set into motion by a wind effecting motion of the flexible sailblades, said sailing craft capable of being steered to a desired direction irrespective of the direction from which the wind is blowing.

2. The sailing craft as set forth in claim 1 wherein the change in orientation of the sailblades is effected by a rotation of each respective boom through an angle of approximately 90 degrees in the leewardly direction.

3. The sailing craft as set forth in claim 2 wherein the means for changing the orientation of the sailblades comprises a plurality of lines each of which interconnects the outer end of a boom to an adjacent spar such that hauling on the lines rotates the booms and thus the sailblades about their respective spars.

4. The sailing craft as set forth in claim 1 wherein the means intercoupling the tubular shaft to the propeller comprises a first gear mounted at one end of the tubular shaft and a second intermeshing gear mounted relative to the first gear, said second gear connected to a flexible drive shaft that intercouples said gear to the propeller such that upon rotation of the tubular shaft the propeller is driven into rotation.

5. The sailing craft as set forth in claim 4 wherein a transmission is provided between the flexible drive shaft and the propeller to reverse the direction of propeller motion for the same rotation of the flexible drive shaft.

6. The sailing craft as set forth in claim 1 wherein the spars carrying the flexible sailblades are adapted to being collapsed in the leewardly direction.

7. The sailing craft as set forth in claim 1 wherein the flotation hull is less than ten feet in length.

8. The sailing craft as set forth in claim 1 wherein the sailblades fill only an outer radial portion of the area between adjacent spars.

9. In combination with a waterborne craft having a sailing type hull, rudder means for steering said hull, and propeller means for moving said craft through the water upon being rotated, a configuration for a mainsail and auxiliary propulsion means comprising:
    a pedestal mast having a base portion anchored within the hull and mounted for rotation about a substantially vertical axis and having a substantially horizontal platform portion extending exteriorly of the hull;
    a tubular shaft;
    windward and leeward bracing members mounted in spaced-apart positions on the platform, said bracing members having the tubular shaft rotatably mounted between them at a windward-to-leeward angle with respect to the platform and such that it may rotate about the shaft axis, said angle established by the maximum roll angle that may be experienced by the hull without capsizing:
    a hub member affixed on said shaft between the bracing members and rotatable therewith, said hub having a plurality of radially extending spars mounted about its periphery, each said spar carrying a sailblade of flexible material thereon that is extended outwardly from the spar by a boom member;
    means mounted with respect to said sailblades for changing the orientation of said sailblades about their respective spars in the leewardly direction;
    vertically oriented sail means extending from the pedestal mast, orthogonally to and leewardly from said sailblades to effect rotation of the mast in response to the direction of the wind and to maintain the sailblades directed substantially into the wind; and
    means intercoupling the tubular shaft at one of its ends to the propeller means to drive the propeller into rotational motion according to the rotational motion of the tubular shaft, said tubular shaft being set into motion in response to the wind effecting motion of the flexible sailblades.

10. The combination as set forth in claim 9 wherein the means for changing the orientation of the sailblades comprises a plurality of lines each of which interconnects the end of a boom to an adjacent spar and hauling in and letting out of the lines effects a change in the leeward orientation of the sailblades.

11. The combination as set forth in claim 10 wherein the lines are terminated in the leeward direction on means mounted within the leeward end of the tubular shaft and adapted to maintain tension on said lines and are terminated in the windward direction on adjustable means mounted at the windward end of the tubular shaft, said adjustable means being positioned so as to move along the shaft axis to effect a change in the movement of the lines in either the windward or leeward directions.

12. The combination as set forth in claim 11 wherein the adjustable means mounted at the windward end of the shaft comprises a collar carrying the terminal ends of the all lines thereon, said collar having a portion mounted within the tubular shaft through longitudinal slots in the shaft and threaded onto an adjustable screw which when turned in the clockwise direction effects a change in the lines and thus the sailblades in the windward direction and when turned in the counterclockwise direction effects a change in the lines and thus the sailblades in the leeward direction.

13. The combination as set forth in claim 12 wherein the means mounted within the tubular shaft to maintain tension on the lines comprises a piston member carrying the termination of the lines thereon and a spring working in conjunction with said piston wherein the spring is compressed by said piston in response to movement of the lines at the collar in the windward direction.

14. The combination as set forth in claim 12 wherein the means mounted within the tubular shaft to maintain tension on the lines comprises a piston member carrying the termination of all the line thereon and a spring working in conjunction therewith wherein the spring is stretched and in tension in response to movement of the lines at the collar in the windward direction.

15. The combination as set forth in claim 9 wherein the sailblade spars are collapsible and stowable in the shaft in the leeward direction.

16. The combination as set forth in claim 9 wherein the means intercoupling the tubular shaft to the propeller means comprises a first bevel gear affixed to at least one end of the tubular shaft and a second bevel gear mounted relatively to and intermeshing the first gear, said second gear connected to a flexible drive shaft the opposite end of which is connected to the propeller means.

17. The combination as set forth in claim 16 wherein the flexible drive shaft is coupled into a transmission whose output is a drive shaft connected to the propeller, said transmission being capable of changing rotational direction of said propeller means without changing the rotational direction of said flexible drive shaft.

18. The combination as set forth in claim 9 wherein the sailblades fill only an outer radial portion of the area between adjacent spars.

19. The sailing craft as set forth in either of claims 1 or 9 wherein the windward-to-leeward angle of the shaft is within 10–40 degrees of the horizontal platform.

20. The sailing craft as set forth in either of claims 2 or 9 wherein the booms are rigidly affixed to their respective spars and the spars are mounted for leewardly rotation within the hub, each said spar carrying a toothed gear for intermeshing with a circular gear mounted for independent rotation on said shaft such that rotation of the circular gear translated into a leewardly orientation of the plurality of sailblades.

* * * * *

UNITED STATES PATENT AND TRADEMARK OFFICE
CERTIFICATE OF CORRECTION

PATENT NO. : 4,353,702

DATED : October 12, 1982

INVENTOR(S) : Laszlo Nagy

It is certified that error appears in the above-identified patent and that said Letters Patent are hereby corrected as shown below:

Claim 15 at Colume 9, line 24, change "in" to -- on --.

Claim 20 at Colume 10, line 25, change "translated" to -- translates --.

Signed and Sealed this

Eighth Day of February 1983

[SEAL]

Attest:

Attesting Officer

GERALD J. MOSSINGHOFF

Commissioner of Patents and Trademarks